(12) United States Patent
Greenwood et al.

(10) Patent No.: US 10,011,394 B2
(45) Date of Patent: Jul. 3, 2018

(54) REUSABLE MAILER BAG

(71) Applicants: Hugh Greenwood, Baldwin, NY (US); Kenneth Greenfield, Merrick, NY (US)

(72) Inventors: Hugh Greenwood, Baldwin, NY (US); Kenneth Greenfield, Merrick, NY (US)

(73) Assignee: Green 2 Green Products, Inc., Merrick, NY (US)

(*) Notice: Subject to any disclaimer, the term of this patent is extended or adjusted under 35 U.S.C. 154(b) by 0 days.

(21) Appl. No.: 14/302,151

(22) Filed: Jun. 11, 2014

(65) Prior Publication Data
US 2015/0360821 A1    Dec. 17, 2015

(51) Int. Cl.
| B65D 30/20 | (2006.01) |
|---|---|
| B65D 27/00 | (2006.01) |
| B65D 27/32 | (2006.01) |
| B65D 27/12 | (2006.01) |
| B65D 33/10 | (2006.01) |
| B65D 33/18 | (2006.01) |
| B65D 33/24 | (2006.01) |

(52) U.S. Cl.
CPC .......... *B65D 31/10* (2013.01); *B65D 33/105* (2013.01); *B65D 33/18* (2013.01); *B65D 33/24* (2013.01); *Y02W 30/807* (2015.05)

(58) Field of Classification Search
CPC .............................. B65D 27/06; B65D 5/4204
USPC ........................... 229/68.1, 302, 76; 383/120
See application file for complete search history.

(56) References Cited

U.S. PATENT DOCUMENTS

| 1,537,956 | A | * | 5/1925 | McNally | .................. | A45C 3/00 |
|---|---|---|---|---|---|---|
| | | | | | | 383/2 |
| 3,138,985 | A | | 6/1964 | Mills | | |
| 4,243,171 | A | * | 1/1981 | Prin | .................. | B65D 5/46088 |
| | | | | | | 229/108.1 |
| 4,729,507 | A | * | 3/1988 | Kim | ....................... | B65D 27/38 |
| | | | | | | 229/301 |
| 4,738,391 | A | * | 4/1988 | Wiseman | ............... | B65D 27/14 |
| | | | | | | 229/68.1 |
| 5,370,461 | A | * | 12/1994 | Smith | .................... | B65D 33/20 |
| | | | | | | 383/14 |
| 5,492,271 | A | * | 2/1996 | Chereton | ............... | B65D 27/06 |
| | | | | | | 229/303 |
| 5,503,328 | A | * | 4/1996 | Roccaforte | ............ | B65D 27/06 |
| | | | | | | 229/301 |
| 6,732,494 | B1 | * | 5/2004 | Nolte | ..................... | B31B 19/26 |
| | | | | | | 493/186 |
| 7,581,886 | B2 | * | 9/2009 | Nitti | ....................... | A45C 3/004 |
| | | | | | | 383/109 |

(Continued)

*Primary Examiner* — Derek Battisti
(74) *Attorney, Agent, or Firm* — Carter, DeLuca, Farrell & Schmidt, LLP

(57) ABSTRACT

A reusable mailer bag includes a front panel, a rear panel, a pair of side panels, and a bottom panel. The panels together define a carrying volume including an opening opposite the bottom panel. A pair of handles are attached to an interior surface of the carrying volume and are configured for positioning entirely within the carrying volume during shipping. The pair of handles are configured to extend out of the opening to convert the reusable mailer bag for use as a carrying bag. A flap is attached to the rear panel at a first end and is configured to extend across the opening to close the opening. The flap is securable to the front panel at a second end by an adhesive strip. The flap is configured to be removed from the mailer bag after shipping.

17 Claims, 4 Drawing Sheets

(56) References Cited

U.S. PATENT DOCUMENTS

| | | | |
|---|---|---|---|
| 7,704,577 B2 | 4/2010 | Shoda | |
| 7,891,490 B2 * | 2/2011 | Raming | B42D 15/006 |
| | | | 206/459.5 |
| 8,033,447 B2 * | 10/2011 | Katoh | G03G 15/0855 |
| | | | 229/101 |
| 8,287,188 B2 | 10/2012 | Hoyord et al. | |
| 8,448,828 B2 | 5/2013 | Nitti | |
| 8,590,774 B1 * | 11/2013 | Sauer | B65D 27/06 |
| | | | 220/265 |
| 8,602,651 B2 * | 12/2013 | Nitti | A45C 3/004 |
| | | | 383/204 |
| 2002/0164088 A1 | 11/2002 | Collins | |
| 2003/0183680 A1 * | 10/2003 | Makofsky | B65D 5/0005 |
| | | | 229/313 |
| 2009/0266722 A1 * | 10/2009 | Rogers | B65D 33/25 |
| | | | 206/216 |
| 2009/0304310 A1 | 12/2009 | Nitti | |
| 2010/0051497 A1 | 3/2010 | Meers | |
| 2010/0172603 A1 | 7/2010 | Lin | |
| 2010/0209019 A1 | 8/2010 | Confoy et al. | |
| 2011/0155794 A1 | 6/2011 | Russell | |
| 2012/0189228 A1 | 7/2012 | Grossman | |
| 2013/0075284 A1 * | 3/2013 | Yee | B65D 27/06 |
| | | | 206/216 |
| 2014/0209332 A1 * | 7/2014 | Burkett | A62C 2/06 |
| | | | 169/49 |

\* cited by examiner

REUSABLE MAILER BAG

BACKGROUND

Technical Field

The present disclosure relates to a reusable mailer bag and a method for using a reusable mailer bag.

Background of Related Art

Shipping packaging is typically provided in disposable form for a single use. In particular, boxes, envelopes, and other forms of shipping packaging are often transported from a merchant to an end user and are then subsequently thrown away or recycled by the end user. The end user typically does not gain any lasting value or use from the shipping packaging.

SUMMARY

A reusable mailer bag and a method of use according to aspects of the present disclosure are now described. The reusable mailer bag provides an end user with shipping packaging that may be repurposed for use as a carrying bag. The end user can therefore realize a return value on the cost of shipping.

In accordance with aspects of the present disclosure, a method includes extending a flap attached to a rear panel of a reusable mailer bag over an opening of the reusable mailer bag, securing the flap to a first removable tape layer of a front panel of the reusable mailer bag, detaching the flap from the front panel and the rear panel, and extending a pair of handles from a carrying volume of the reusable mailer through the opening of the reusable mailer.

In an aspect of the present disclosure, detaching the flap from the front panel includes tearing the flap along a first tear strip.

In a further aspect of the present disclosure, detaching the flap from the rear panel includes tearing the flap along a second tear strip.

In another aspect of the present disclosure, the first tear strip includes perforations.

In an aspect of the present disclosure, detaching the flap from the front panel includes detaching the first removable tape layer from the front panel.

In an aspect of the present disclosure, the method further includes attaching a shipping label to a second removable tape layer of the front panel.

In a further aspect of the present disclosure, the method further includes detaching the second removable tape layer from the front panel to remove the shipping label from the front panel.

In another aspect of the present disclosure, detaching the second removable tape layer reveals a hidden surface selected from the group consisting of a promotional code, an advertisement, and a writable surface.

In an aspect of the present disclosure, the reusable mailer bag is non-reversible.

In another aspect of the present disclosure, an interior surface of the carrying volume includes a bubble lined protective layer and the method further includes removing the bubble lined protective layer.

In accordance with aspects of the present disclosure, a reusable mailer bag is disclosed including a front panel, a rear panel, a pair of side panels, and a bottom panel. The panels together define a carrying volume including an opening opposite the bottom panel. A pair of handles are attached to an interior surface of the carrying volume and are configured for positioning entirely within the carrying volume during shipping. The pair of handles are configured to extend out of the opening. A flap is attached to the rear panel at a first end and is configured to extend across the opening to close the opening. The flap includes a second end that is securable to the front panel. The flap is configured to be removed from the mailer bag after shipping.

In an aspect of the present disclosure, the second end of the flap is securable to a first tape layer of the front panel.

In a further aspect of the present disclosure, the first tape layer is removable from the front panel to detach the flap from the front panel.

In another aspect of the present disclosure, the second end of the flap includes an adhesive layer. The adhesive layer is configured to adhere to the first tape layer of the front panel when the second end of the flap is secured to the front panel.

In an aspect of the present disclosure, the front panel further includes a second tape layer configured to receive a shipping label.

In a further aspect of the present disclosure, the front panel includes a hidden surface disposed under the second tape layer. The second tape layer may be removable to reveal the hidden surface. The hidden surface may be selected from the group consisting of a promotional code, an advertisement, and a writable surface.

In another aspect of the present disclosure, the flap includes a first tear strip adjacent the first end. The first tear strip is tearable to detach the flap from the rear panel.

In a further aspect of the present disclosure, the flap includes a second tear strip adjacent the second end. The second tear strip is tearable to detach the flap from the front panel.

In an aspect of the present disclosure, the side panels include recessed portions adjacent the opening. The recessed portions are secured to the front and rear panels adjacent the opening and are recessed relative to side edges of the front and rear panels. The recessed portions are configured to inhibit tampering with the carrying volume when the flap closes the opening.

In a further aspect of the present disclosure, the recessed portions inhibit the reusable mailer bag from being reversed.

In an aspect of the present disclosure, an interior surface of the carrying volume includes a bubble lined protective layer.

In a further aspect of the present disclosure, the bubble lined protective layer is removable.

Any of the above aspects and embodiments of the present disclosure may be combined without departing from the scope of the present disclosure.

BRIEF DESCRIPTION OF THE DRAWINGS

Various aspects of the present disclosure are described hereinbelow with reference to the drawings, wherein.

DETAILED DESCRIPTION

Figure 1:
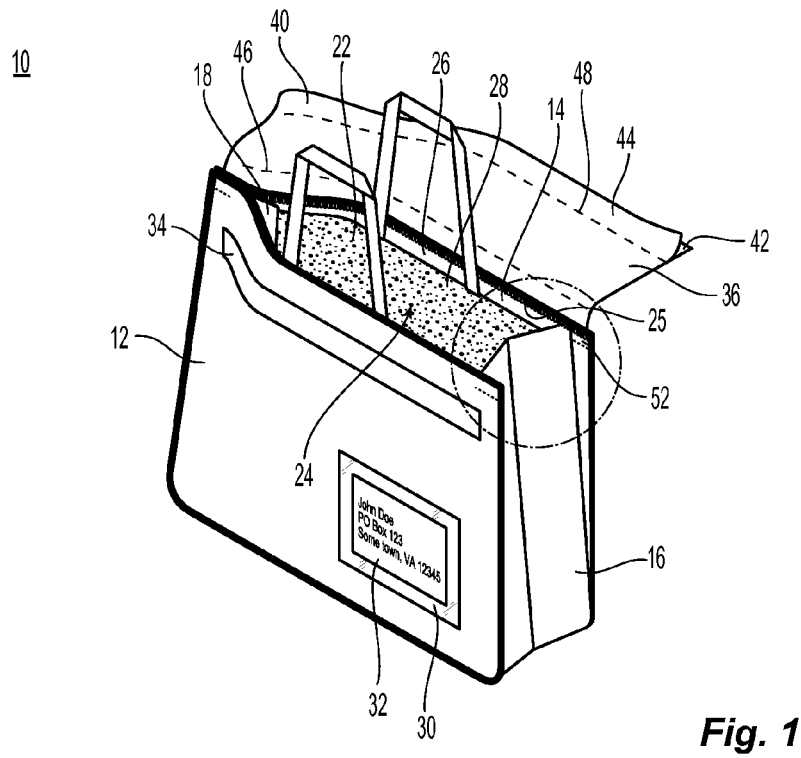
FIG. 1 is a perspective view of a reusable mailer bag provided in accordance with the present disclosure.
Figure 2:
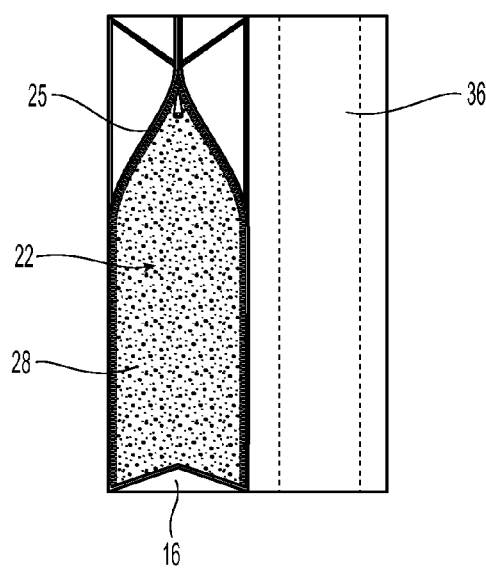
FIG. 2 is a top view of the reusable mailer bag of FIG. 1, illustrating the closure mechanism and the carrying volume.
Figure 6:
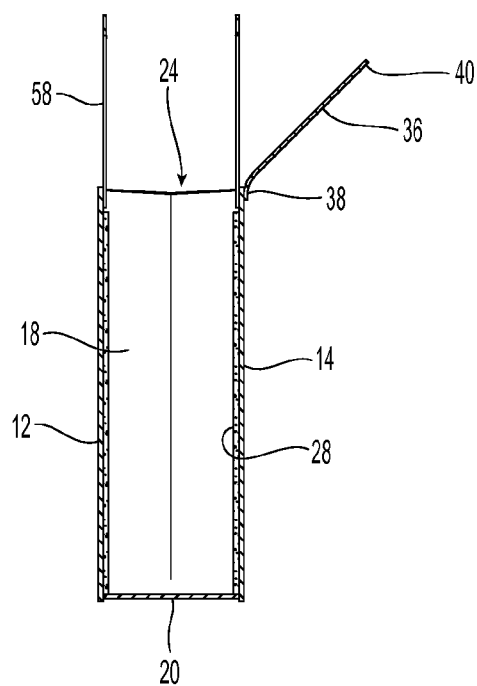
FIG. 6 is a side cross-section view of the reusable mailer bag of FIG. 1.

Referring now to FIG. 1, a mailer bag 10 is provided in accordance with the present disclosure. The mailer bag 10 includes a front panel 12, a rear panel 14, a first side panel 16, a second side panel 18, and a bottom panel 20 (FIG. 6). The panels 12, 14, 16, 18, and 20 are joined together by stitching, gussets, or other similar methods of joining to form a carrying volume 22. An opening 24 opposite the bottom panel 20 provides access to the carrying volume 22. As shown in FIG. 2, carrying volume 22 includes a closure mechanism 25, for example, a zipper, snaps, or other similar forms of closure, adjacent opening 24 that is configured to selectively close opening 24.

Panels 12, 14, 16, 18, and 20 may be formed from a fabric material. For example, panels 12, 14, 16, 18, and 20 may be formed of polypropylene, 120-180 GSM, or other similar materials. The fabric material may be woven or non-woven. The panels 12, 14, 16, 18, and 20 may include various graphical art designs including four color art designs and may include sublimation imprints. The graphical art designs may include advertising. The outer surfaces of panels 12, 14, 16, 18, and 20 may also be laminated to provide resistance to weather elements such as, for example, water. In an embodiment, the outer surfaces of panels 12, 14, 16, 18, and 20 may be formed of or may be laminated with a material that is resistant to common adhesives such as those commonly used with shipping labels. Accordingly, in some embodiments, common adhesives may not be sufficient to secure a shipping label or other materials to the outer surfaces of panels 12, 14, 16, 18, and 20. In this instance a user would adhere the shipping label 32 and flap 36 to the respective tape layers 30 and 34 as described in more detail below.

As shown in FIG. 1, the interior surface 26 of carrying volume 22, i.e., the interior surfaces of panels 12, 14, 16, 18, and 20, may include a plastic bubble lined protection layer 28 for protecting items transported in the carrying volume 22. The protection layer 28 may be removable and may include, for example, perforations, removable adhesive, or other similar features that allow for separation of the protection layer 28 from the interior surface 26 of carrying volume 22.

Figure 3:
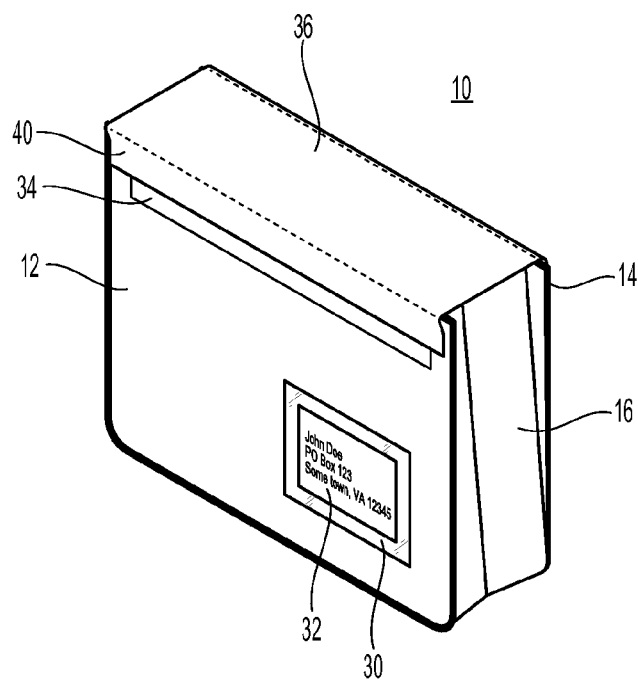
FIG. 3 is a perspective view of the reusable mailer bag of FIG. 1, illustrating the flap extended over the opening and secured to the front panel.
Figure 4:
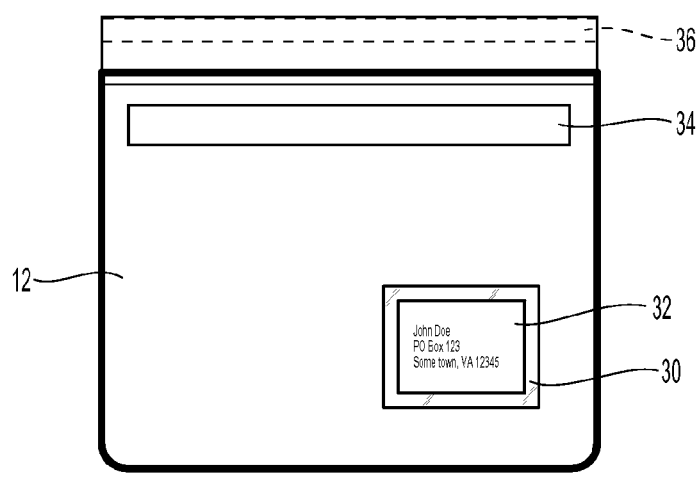
FIG. 4 is a side view of the front panel of the reusable mailer bag of FIG. 1.

As shown in FIGS. 3 and 4, a first tape layer 30 is adhered to front panel 12 and provides an adhesive friendly surface for receiving a shipping label 32. First tape layer 30 may be transparent and may be formed of a plastic material. First tape layer 30 may include an adhesive backing. In an embodiment, the adhesive backing may include an adhesive such as, for example, adhesives sold by 3M Company, that are suitable for adhering to the outer surfaces of panels 12, 14, 16, 18, and 20. In this instance, the particular adhesive of the first tape layer 30 adheres to the panels 12, 14, 16, 18, and/or 20 even if the panels 12, 14, 16, 18, or 20 are made from a material or are coated with a laminate that generally resists common adhesives. Hence, only designated tapes 30, 34 may are adhereable (or adhereable in a substantially secure manner) to the panels 12, 14, 16, 18, and 20 at specified locations.

Figure 7:
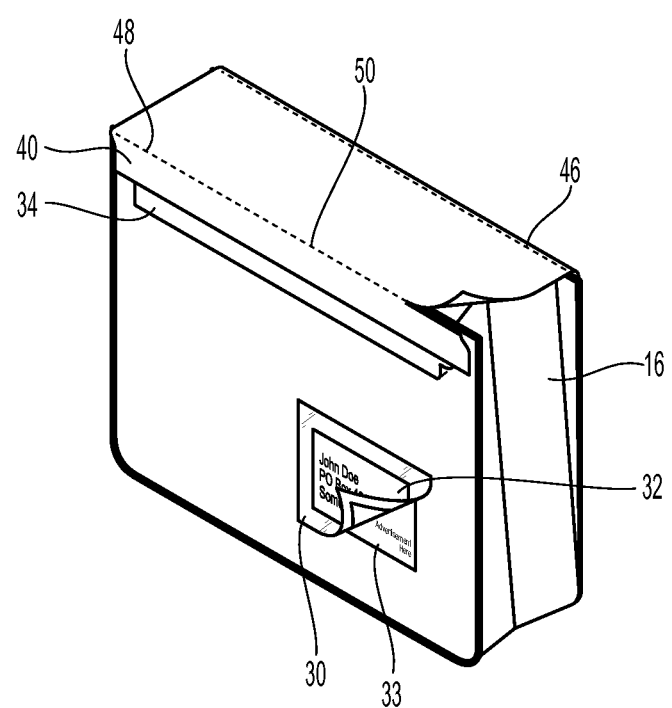
FIG. 7 is a perspective view of the reusable mailer bag of FIG. 2, illustrating partial removal of tape layers and tear strips of the reusable mailer bag.

Shipping label 32 and/or first tape layer 30 may be removable by an end user to reveal a hidden surface 33, as shown, for example, in FIG. 7. For example, in an embodiment, hidden surface 33 may include a promotional code that may be redeemable by the end user online or in a brick and mortar store. In an alternative embodiment, hidden surface 33 may include advertising. In yet another alternative embodiment, hidden surface 33 may include a writable surface on which the end user may take notes. Mailer bag 10 may also include a writing instrument (not shown), such as, for example, an erasable or non-permanent marker, within carrying volume 22 for use by an end user to write on the writable surface.

With continued reference to FIGS. 3 and 4, a second tape layer 34 is adhered to front panel 12 adjacent opening 24 to provide an adhesive friendly surface for receiving attachment of a flap 36. Second tape layer 34 may be transparent and may be formed of a plastic material. Second tape layer 34 may include an adhesive backing. In an embodiment, the adhesive backing may include adhesives such as, for example, adhesives sold by 3M Company, that are suitable for adhering to the outer surfaces of panels 12, 14, 16, 18, and 20. In this instance, the particular adhesive of the first tape layer 30 adheres to the panels 12, 14, 16, 18, and/or 20 even if the panels 12, 14, 16, 18, or 20 are made from a material or are coated with a laminate that generally resists common adhesives. Hence, only designated tapes 30, 34 may be adhereable (or adhereable in a substantially secure manner) to the panels 12, 14, 16, 18, and 20 at specified locations. Rear panel 14 may also include a third tape layer (not shown) similar to second tape layer 34.

First and second tape layers 30 and 34 are removably attached to front panel 12 by the adhesive backing or other similar forms of attachment. In an embodiment, the adhesive backing may include an adhesive that is a different kind of adhesive than that used for shipping label 32 to provide for adhesion to outer surfaces of panels 12, 14, 16, 18, and 20 when the outer surfaces of panels 12, 14, 16, 18, and 20 are resistant to adhesion of common adhesives such as those used for shipping labels.

Flap 36 is attached to rear panel 14 at a first end 38 (FIG. 6) and is configured to extend across the opening 24 to cover opening 24, as shown in FIG. 3. A second end 40 of flap 36 is securable to the second tape layer 34 of front panel 12 by an adhesive strip 42 (FIG. 3). As shown in FIG. 1, flap 36 includes a protective layer 44 covering adhesive strip 42 which is removable from flap 36 prior to securing second end 40 to second tape layer 34 of front panel 12. Flap 36 includes a first tear strip 46 adjacent first end 38 and a second tear strip 48 adjacent second end 40 which are tearable to remove flap 36 from mailer bag 10, as shown, for example, in FIG. 7. First and second tear strips 46 and 48 may include perforations 50.

Figure 5:
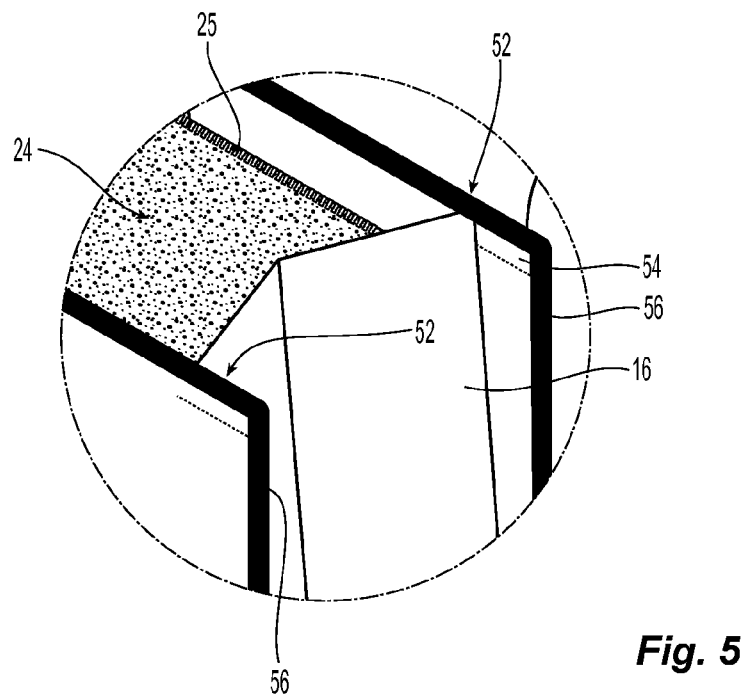
FIG. 5 is an enlarged view of the area of detail depicted in the FIG. 1.

As shown in FIG. 1, each of first and second side panels 16 and 18 includes recessed portions 52 adjacent opening 24 to provide additional protection against pilfering when the flap 36 is secured to front panel 12 to close opening 24. As shown in more detail in FIG. 5, recessed portions 52 are formed by attaching each of side panels 16 and 18 to front and back panels 12 and 14 respectively adjacent opening 24 through the use of stitching, heat welding, or other similar methods, such that side panels 16 and 18 are recessed relative to the side edges 56 of front and back panels 16 and 18. Recessed portions 52 are also configured to inhibit carrying volume 22 and mailer bag 10 from being reversed. In some embodiments, the mailer bag 10 is non-reversible.

As shown in FIGS. 1 and 6, each of front panel 12 and rear panel 14 includes a handle 58, 60 attached to interior surface 26 adjacent opening 24. Handles 58 and 60 are configured to be received entirely within carrying volume 22 and are extendable out of opening 24 when opening 24 is not closed by flap 36.

The use and operation of mailer bag 10 will now be described below.

In an initial state, opening 24 is uncovered with flap 36 attached to rear panel 14, as shown in FIG. 1. An item or product (not shown) to be shipped to an end user, e.g., a customer or consumer, is inserted into carrying volume 22 and a shipping label 32 is applied to the first tape layer 30. Handles 58 and 60 are positioned entirely within carrying volume 22 and the protective layer 44 of flap 36 is removed to expose adhesive strip 42. Flap 36 is then extended across opening 24 to close opening 24, as shown in FIG. 3. Adhesive strip 42 is attached to second tape layer 34 of front panel 12 to secure flap 36 in place. Mailer bag 10 is now prepared for shipping to an end user.

Referring now to FIG. 7, after shipping, once the end user has received mailer bag 10, the flap 36 is removed by tearing along the tear strips 46 and 48 of flap 36. In addition, or alternatively, the second tape layer 34 may be removed from front panel 12 to remove flap 36. In an embodiment, first end 38 of flap 36 may also be removable from rear panel 14 by removing a third tape layer (not shown) on rear panel 14 that is similar to second tape layer 34.

With continued reference to FIG. 7, the end user may remove the shipping label 32 and/or first tape layer 30 to reveal hidden surface 33 which, as described above, may include promotional codes, advertising, or a writable surface.

Once the flap 36 has been removed, handles 58 and 60 may be extended from the carrying volume 22 through opening 24 such that mailer bag 10 is converted into a carrying bag or tote.

In an embodiment, replacement first and second tape layers (not shown) maybe provided or included with mailer bag 10 that are similar to first and second tape layers 30 and 34 may be added to front panel 12 by the end user. A new shipping label 32 may then be attached to the replacement first tape layer to allow for further shipping. In this embodiment, an additional adhesive strip (not shown) and protective layer (not shown) which is similar to adhesive strip 42 and protective layer 44 may be provided on flap 36 adjacent tear strip 46. The flap 36 is partially detached from mailer bag 10 by only tearing along tear strip 46 to provide access to carrying volume 22 through opening 24 and the flap 36 may be extended over opening 24 to close carrying volume 22 once an item to be shipped has been added to carrying volume 22. The additional adhesive strip and protective layer allows flap 36 to be secured to the second replacement tape layer in a similar manner to that described above for adhesive strip 42, protective layer 44, and second tape layer 34 to provide a second closure of the opening 24 for the second shipping. In this manner the mailer bag 10 may be re-used by the end user for shipping another item or product.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A reusable mailer bag comprising:
a front panel, a rear panel, a pair of side panels, and a bottom panel, interior surfaces of the panels together defining a carrying volume, the carrying volume including an opening opposite the bottom panel, the side panels including recessed portions adjacent the opening such that the side panels are spaced apart from side edges of the front and rear panels adjacent the opening to reduce a length of the opening opposite the bottom panel, a top edge of each of the side panels attached to each of the front and rear panels spaced apart from the side edges of the front and rear panels, the recessed portions configured to inhibit tampering with the carrying volume when the flap closes the opening;
a pair of handles attached to the interior surface of the front and rear panels and configured for positioning entirely within the carrying volume during shipping, the pair of handles configured to extend out of the opening; and
a flap formed separate and distinct from the front, rear, side, and bottom panels configured to extend across the opening to close the carrying volume during shipping, the flap including a first end portion attached to the rear panel and a second end portion securable to the front panel, the flap configured to be completely removed from the mailer bag after shipping.

2. The reusable mailer bag according to claim 1, wherein the second end portion of the flap is securable to a second tape layer of the front panel.

3. The reusable mailer bag according to claim 2, wherein the second tape layer is removable from the front panel to detach the flap from the front panel.

4. The reusable mailer bag according to claim 2, wherein the second end portion of the flap includes an adhesive layer, the adhesive layer configured to adhere to the second tape layer of the front panel when the second end portion of the flap is secured to the front panel.

5. The reusable mailer bag according to claim 1, wherein the front panel further includes a first tape layer configured to receive a shipping label.

6. The reusable mailer bag according to claim 5, wherein the front panel further includes a hidden surface disposed under the first tape layer, the first tape layer removable to reveal the hidden surface, the hidden surface selected from the group consisting of a promotional code, an advertisement, and a writable surface.

7. The reusable mailer bag according to claim 1, wherein the flap includes a first tear strip adjacent the first end portion, the first tear strip tearable to detach the flap from the rear panel.

8. The reusable mailer bag according to claim 7, wherein the flap includes a second tear strip adjacent the second end portion, the second tear strip tearable to detach the flap from the front panel.

9. The reusable mailer bag according to claim 1, wherein an interior surface of the carrying volume includes a bubble lined protective layer.

10. The reusable mailer bag according to claim 9, wherein the bubble lined protective layer is removable.

11. The reusable mailer bag according to claim 1, wherein the side panels include recessed portions adjacent the opening, the recessed portions configured to inhibit the reusable mailer bag from being reversed.

12. The reusable mailer bag according to claim 1, wherein the reusable mailer bag is non-reversible.

13. The reusable mailer bag according to claim 1, wherein the flap is configured to be attached to the rear panel and secured to the front panel after being removed to seal the carrying volume.

14. The reusable mailer bag according to claim 1, wherein each side panel has a linear front side edge and a linear rear side edge, each front side edge attached along an entire length thereof to the front panel and each rear side edge attached along an entire length thereof to the rear panel.

15. The reusable mailer bag according to claim 1, wherein each side panel has a bottom edge that is coincident with a side edge of the bottom panel.

16. The reusable mailer bag according to claim 15, wherein each side panel has a front side edge that is linear from the bottom edge to the top edge and a rear side edge that is linear from the bottom edge to the top edge.

17. The reusable mailer bag according to claim 16, wherein an entire length of the front side edge of each side panel is attached to the front panel.

* * * * *